INVENTOR.
Mathew J. Marty Sr.,
BY Mathew J. Marty Jr.,

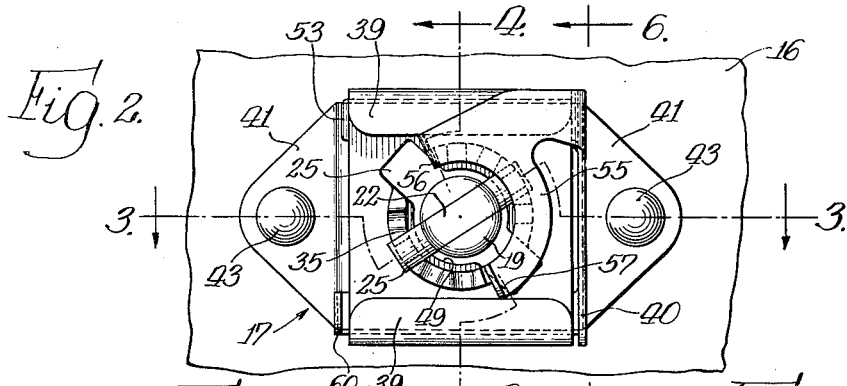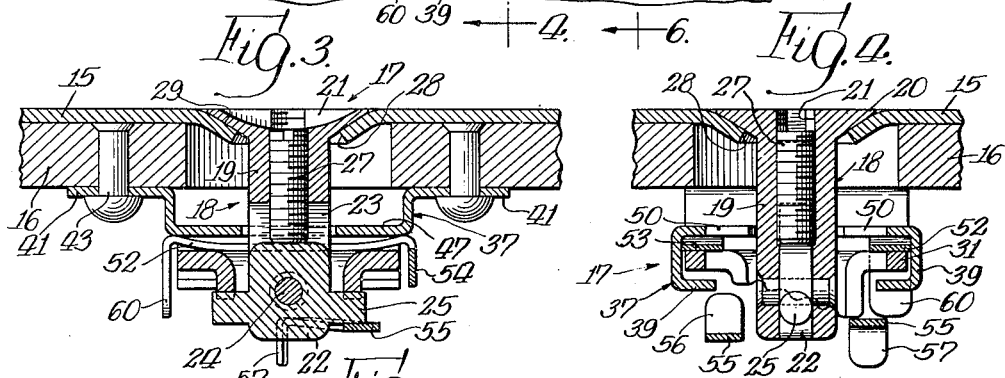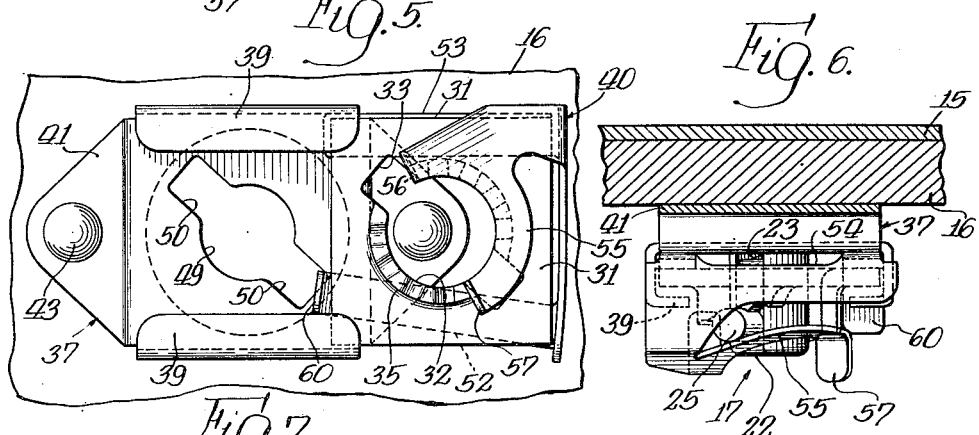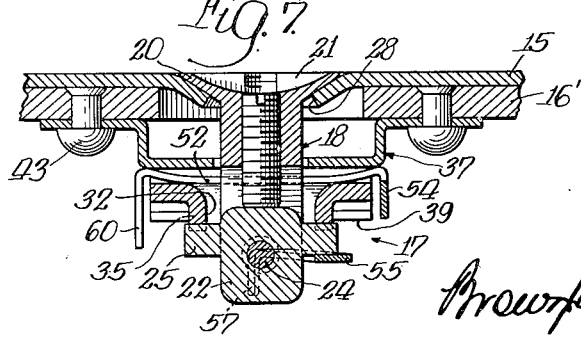

UNITED STATES PATENT OFFICE 2,508,616

FASTENING DEVICE

Mathew J. Marty, Sr., and Mathew J. Marty, Jr., Chicago, Ill.; said Marty, Jr., assignor to said Marty, Sr.

Application February 7, 1944, Serial No. 521,328

4 Claims. (Cl. 24—221)

The present invention relates to a fastening device and more particularly to a fastening device for detachably securing two parts together. The invention is particularly adapted for use for detachably securing two plates or panel members together, for example, the cowling of airplanes and other parts thereof.

In a prior application of Mathew J. Marty, Sr., one of the present joint applicants, Serial No. 450,388, filed July 10, 1940, and which eventuated in Patent No. 2,337,483, December 21, 1943, there is disclosed a fastening device comprising a rotatable fastening element adapted to be associated with a detachable panel or part having a shank portion extending through an opening in the panel provided therefor. The shank portion is provided with an enlarged head at one end and a pin extending transversely of the longitudinal axis of the shank at its other end. A second or nonrotatable fastening element of a character adapted to be engaged by the rotatable element to be interlocked therewith upon rotation of the latter is disposed within a housing or carrier member which is secured to the other plate or part. In the airplane art this would constitute a stationary or fixed frame member of the airplane. The second fastening element is confined within the housing or carrier member against rotation but is free to move longitudinally of the axis of the shank of the rotatable element. A spring element or other resilient means is also disposed within the housing and confined therein against rotation. The present invention is in the nature of an improvement over the device of the application referred to and is concerned with the provision of a suitable carrier member for detachably mounting the nonrotatable fastening element and the spring means for biasing the two parts to be secured together in the interlocked position of the fastening elements. We have found that by reason of the frequent removal of the cowlings of airplanes or the like that the locking means of the nonrotatable element and the spring are frequently destroyed so that the locking or fastening means becomes ineffective.

It is an object of our invention therefore to provide a fastening device of the character above noted which incorporates a novel arrangement of the nonrotatable fastening element with a panel or the like providing for removal of the nonrotatable fastening element and the spring means for biasing the parts together.

In our present invention we have provided a novel form of spring means having a portion which is adapted to overlie the nonrotatable or stationary fastening element, which, in the present disclosure comprises a stepped cam member, with this portion of the spring being formed to act as a throwout means when the rotatable fastening element is in its non-engaged position with respect to the nonrotatable fastening element.

The spring member is further formed with a resilient arm member which normally is positioned to engage the carrier member for holding the cam means and the spring member of the nonrotatable fastening means in assembled relation with respect to the panel with which the latter is associated. This resilient arm member may be readily positioned so that the cam member and the spring may be readily removed for inspection or replacement.

A further feature of our invention lies in the provision of a novel form of rotatable fastening element which comprises a shank member slotted at one end thereof to receive a locking member and having locking means providing for the positioning of the locking element to dispose the locking means thereof in different positions with respect to the slotted end of the shank. By adjusting the position of the locking member relative to the shank it may be readily adapted for detachably securing panels of different thicknesses to each other. The locking member is formed with cylindrical projections which preferably extend laterally of its axis of rotation in the shank of the rotatable fastening means, and in nonintersecting relation with respect to this axis so that the locking member may be positioned to bring the cylindrical projections at either one of two distances from the adjacent slotted end of the shank member. A set screw is suitably associated with the shank member to retain the locking member in fixed position with respect to the shank member.

Other objects and advantages will appear from the detail description.

It will be understood that the invention is applicable for use in instances other than airplane cowlings, but it is particularly useful in this field and hence it will be understood that the following description is only illustrative of one application of the invention.

Now, in order to acquaint those skilled in the art with the manner of constructing and operating a device in accordance with the teachings of our invention, we shall disclose in connection with the accompanying drawings a preferred embodiment of the same.

In the drawings:

Figure 2 is a bottom view of the fastening device of our invention;

Figure 3 is a detail horizontal sectional view taken substantially on line 3—3 of Figure 2 looking in the direction indicated by the arrows;

Figure 4 is a detail vertical sectional view taken substantially on the line 4—4 looking in the direction indicated by the arrows;

Figure 5 is a bottom view illustrating the manner in which the nonrotatable fastening means and spring means of the invention are inserted in a retaining member therefor carried by one of the panels;

Figure 6 is a sectional view taken substantially on the line 6—6 of Figure 2 looking in the direction indicated by the arrows; and Figure 7 is a sectional view similar to Figure 3 but showing the fastening device of our invention as it may be used in securing two panels together of different thicknesses than the panels shown in Figure 3.

Figure 1:
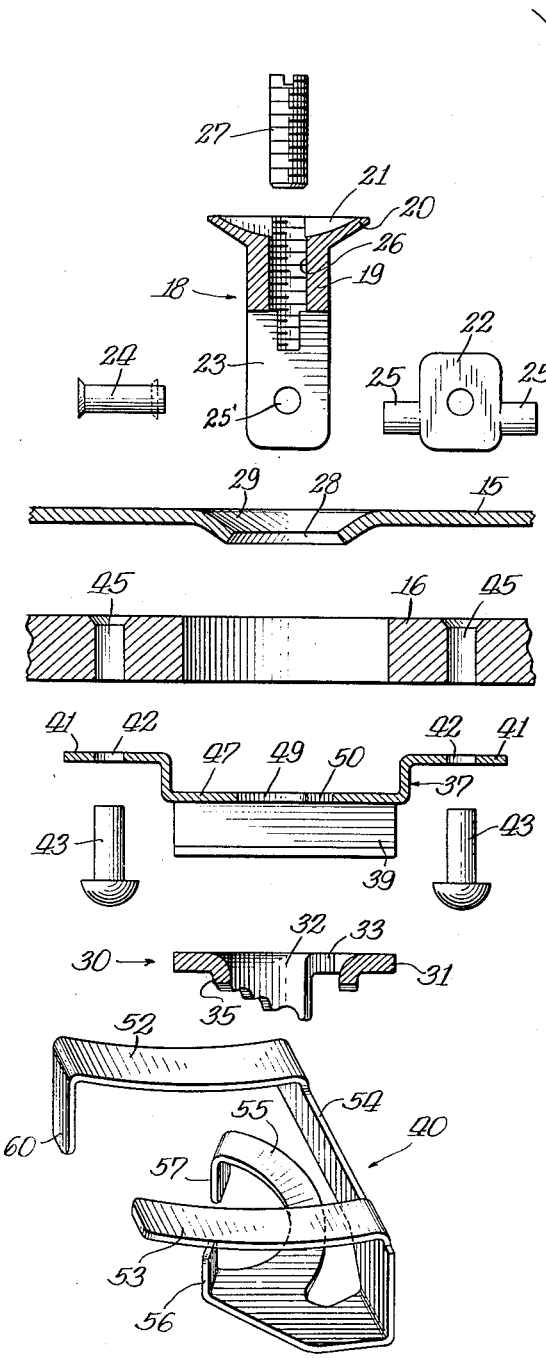
Figure 1 is a sectional view through the several parts of the fastening device of the present invention in spaced apart and disassembled relation, with the spring means thereof shown in perspective, and showing a pair of plate members in section which are adapted to be detachably secured together by the fastening device herein disclosed.

In Figures 1 through 6 of the drawings, we have shown a pair of plate members or panels 15 and 16 which are adapted to be detachably secured together by the fastening means 17 of our present invention. For purposes of this disclosure, the fastening means 17 will be described in connection with the cowling of an airplane, and it will be understood that the plate or part 15 comprises or represents the removable cowling, and the plate member or part 16 comprises a portion of the airplane to which the cowling 15 is adapted to be removably attached.

The fastening device 17 comprises a rotatable fastening means 18 having a shank 19 at one end of which an enlarged operating head 20 is formed with a screw driver kerf 21 for receiving a screw driver to rotate the same. A locking member 22 is adapted to be received within an opening 25' the slotted end 23 at the end of the shank 19 opposite the enlarged head 21. A stud 24 extends transversely of the longitudinal axis of the shank portion 19 between the arm portions defining the slot 23 to provide an axis of rotation for the locking member 22, which axis as before noted extends transversely of and at right angles to the longitudinal axis of the shank 19. The locking member 22 is formed with a pair of cylindrical projections 25 which in the assembled position of the locking member 22 in the slot 23 of the shank extend laterally of the rotatable axis for the member 22 as defined by the stud 24. As before noted the projections 25 are of cylindrical configuration and it will be observed from an examination of Figure 1 that the axes of the projections 25 extend substantially at right angles to and in non-intersecting relation with the axis of rotation of the locking member 22. The shank member 19 is formed with a threaded bore 26 extending coaxially of its longitudinal axis through the kerf 21 in the enlarged head portion 20 and opens into the closed end of slot 23. A set screw 27 is adapted to have threading engagement with the threaded bore 26 of the shank and the inner end of the set screw 27 retains the locking member 22 in fixed position with respect to the shank. It will be observed that the locking member 22 may be positioned so that the longitudinal axes of the cylindrical projections 25 lie to either side of the rotational axis as defined by the stud 24 for the locking member 22 to provide two positions for the cylindrical projections with respect to the ends of the shank 19. The rotatable fastening means 18 is adapted to be assembled with the panel 15 by inserting the shank member 19 through a suitable opening 28 provided therein after which the locking member 22 is positioned within the slot 23 of the shank and the stud 24 inserted and its end peened or spread to secure the locking member in the slot. The locking member 22, except when held in a fixed position by means of the set screws 27, may be rotated about the stud 24. The slot 23 is of sufficient length to permit full 360° rotation of locking member 22 when the set screw is withdrawn from the slot. It will be observed that the enlarged head 20 of the stud 19 is provided with a tapered surface which corresponds to the taper 29 surrounding the opening 28 of the panel 15 so that in the interlocked positions of the fastening means 17 and 18, the head 20 will lie flush with the outer surface of the panel 15.

Preferably, the cylindrical projections 25 are of a length so that, as will be clear from Figures 3 and 7, they project beyond the edge of the hole 28 formed in the panel 15 to normally retain the rotatable fastening means in assembled relation with the panel.

A second or nonrotatable fastening means 30 comprises a plate member 31 having an opening 32 from which diametrically opposed slots 33 extend. The plate member 31, in the embodiment of the invention shown, comprises a pair of flange elements 35 extending coaxially of the longitudinal axis of the shank 19 of the stud, which flange elements are formed with inclined stepped cam edges extending in a direction away from the base of the plate member for receiving the cylindrical end portions 25 of the locking member of the rotatable fastening element in any one of a number of desired positions. The plate member 31 is of rectangular configuration, as viewed in plan, and is adapted to be disposed in a carrier member 37 in a manner to prevent rotational movement of the plate member 31 with respect to the carrier member 37.

The carrier member 37 comprises a pair of parallel opposed flange members 39 at opposite edges of the central portion 47 thereof. The flanges 39 form opposed channels for slidingly receiving the plate member 31 and the spring means 40. A pair of offset tongue portions 41 are formed integrally with the carrier member 37 and are provided with holes 42 through which rivets 43 extend into holes 45 suitably formed in the panel 16. The ends of the rivets are peened to secure the carrier member 37 to the panel 16. The offset tongue portions 41 space the central portion 47 away from the adjacent surface of the panel 16. The central portion 47 of the carrier member is formed with a substantially circular opening 49 from which extend diametrically opposed slots 50, the circular opening 49 and the slots 50 being of a character to permit insertion of the shank 19 and locking member 22 therethrough.

The spring means 40 comprises a pair of arm members 52 and 53 which extend substantially at right angles to an end wall 54. The arm members 52 and 53 in the assembled position of the spring with the locking plate 31 in the carrier member 37 lie between the plate member 31 and the central portion 47 of the carrier member and extend lengthwise in the same direction as the flanges 39 of the carrier member. The arms 52 and 53 are curved preferably in a single direction with the concave surfaces thereof adjacent the surface of the central portion 47 of the carrier member. In normal position, the arm members 52 and 53 are spaced from each other a distance substantially equal to the distance between the opposed flanges 39 so that the spring means 40 may be positioned therebetween.

The spring means 40 is further provided with an arcuate arm member 55 which extends from the other edge of end wall 40 at the end thereof adjacent arm member 53. In the assembled position of the plate member 31 with the spring means 40, the arcuate arm member 55 overlies one of the stepped cams of one of the flanges 35 of the plate member. The arcuate arm 55 is formed with end stop elements 56 and 57, with the end element 56 extending in a direction toward the panel 16 and with the end element 57 extending in a direction away from the panel 16. These end elements are designed so that they are at the high ends of the stepped cams and serve to prevent the projections 25 of the locking member 22 from riding off the stepped cams.

The locking plate 31 is carried between the arm members 52 and 53, and the arcuate arm member 55 of the spring means 40. As shown in Figures 1 through 6, the arm member 52 is provided with an end element 60 extending in a direction away from the panel 16. Referring now to Figure 5 it will be seen that the spring means 40 and the locking plate 31 are assembled in the carrier member 37 by positioning of the arm member 52 with the outer edge thereof engaging the inner edge of one of the flanges 39 of the carrier member 37, and by sliding the assembly of the spring means 40 and locking plate 31, with opposite edges of the latter in the channels formed by flanges 39 and arm member 53 in the channel of the flange 39 opposite the flange engaged by arm member 52, rectilinearly until the end element 60 of the arm 52 reaches the end of its associated flange member 39 whereupon it snaps into the position shown in Figure 2. In this position it will engage the adjacent end of its associated flange member 39 and together with the end wall 54 prevents sliding movement of the spring and plate member 31 in either direction in the carrier member 37. When it is desired to remove the plate member and spring, the end 60 of the arm member 52 is grasped forcing the arm 52 inwardly to a position freeing it from its associated flange 39 so that the spring member and plate member 31 may be removed by sliding movement from the carrier member 37.

It will be observed from Figure 5 that the slots 50 extending from the central opening 49 of the carrier member 37 and the slots 33 extending from the central opening 32 of the locking plates 31 are arranged so that they are in alignment enabling insertion of the shank 19 and the cylindrical projections 25 of the locking member 22 in position to engage the lowermost portion of the stepped cams formed in the edges of the flanges 35. With the parts arranged as described, the projections 25 may be disposed in interlocked relation with respect to the stepped cams of the plate member 35 by rotating the rotatable fastening elements 18 in a counterclockwise direction as viewed in Figure 2.

In the preferred form of our invention the arcuate arm portion 55 of the spring is bowed in a direction so that the end thereof adjacent the stop element 57 overlies one of the slots 33 of the locking plate 31. In removing the removable panel 15 from the stationary panel 16, the spring acts to throw out the rotatable element 18 when the latter is rotated so that the projections 25 thereof are brought into alignment with the opposed slots 33 of the plate member 31. In this manner the arcuate spring 55 acts as a throw-out spring to position the rotatable fastening means in disengaged position with respect to the stepped cams of plate member 31.

With the rotatable fastening element assembled with the panel 15 as described, and with the plate member 31 and spring means 40 disposed in the carrier member 37, as described, it will be seen that the panels 15 and 16 may be detachably secured together by inserting the shank portion 19 and locking element 22 through the openings provided therefor in the panel 16, the central portion 47 of the carrier member and the plate member 31. Then by forcing the rotatable fastening means 18 inwardly and rotating it, the cylindrical projections 25 of the locking member 22 may be caused to engage in any of the several notches of the stepped cams of the flanges 35 of the plate member 31. When the cylindrical projections 25 of the locking member 22 are engaged with any of the notches of the stepped cam, the spring arm members 52 and 53 of the spring means are compressed by movement of the plate member 31 toward the panel 16. The plurality of notches provided in the stepped cams of the plate member 31 accommodates the application of the fastening device of the present invention to panels of varying thicknesses.

It will be observed that the plate member 31 and the spring means 40 are restrained by the carrier member 37 against rotation and that the plate member 31 moves axially of the longitudinal axis of the shank 19 of the rotatable fastening means 18 upon interlocking of the latter with the cams of plate member 31. The plate member 31 and spring means 40 are not mechanically fixed to any other part, so that if either the spring means or the plate member 31, or both, should fail they may be readily removed in the manner described and replaced. The carrier member 37 is adapted to be permanently secured to the panel 16, and since it is not subject to wear, the invention has particular utility in airplane construction in that both fastening means may be repaired or replaced without removing any rivets from structural members of an airplane. In prior devices certain of the parts of the fastening devices or housings therefor are fixed by rivets to light metal structural members in which removal of the rivets frequently causes runs. Also, the carrier member 37 may be constructed of aluminum or other light material since it is not subjected to wear, and hence the fastening device of the present invention is effective in reducing the overall weight of an airplane.

Referring now to Figure 7, it will be observed that the fastening device has been shown as utilized with a panel or part 16' of less thickness than the panel 16 of the previously described embodiment of our invention. In this adaptation of our invention, the locking member 22 has been rotated 180 degrees about its stud 24 to position the cylindrical projections 25 closer to the operating head 20 of the rotatable fastening means 18 to compensate for the thinner plate member 16'. In other respects the drawings of Figure 7 is the same as that shown in Figure 3.

While we have shown what we consider to be the preferred embodiment of our invention, it will be understood that various modifications and rearrangements may be made therein without departing from the scope of our invention.

We claim:

1. A fastening means of the character described comprising a shank member, a locking element, means associated with said shank member and said locking element for rotatably mounting said locking element adjacent one end of said shank member about an axis extending transversely of and intersecting the longitudinal axis of said shank, said locking element having substantially cylindrical locking projections the axes of which extend at substantially right angles to and in non-intersecting relation with said axis of said locking element.

2. The fastening means of claim 1 characterized by the provision of means associated with said shank member for retaining the locking element in a fixed position with respect to the shank member.

3. A fastening device of the character described comprising a shank member slotted at one end thereof, a locking element, a stud extending transversely of the longitudinal axis of said shank member through the slotted end thereof providing an axis of rotation for the locking element, said locking element being formed with substantially cylindrical projections the longitudinal axes of which extend at right angles to and in non-intersecting relation with respect to said axis of said locking element.

4. A fastening device of the character described comprising a shank member slotted at one end thereof, a locking element, a stud extending transversely of the longitudinal axis of said shank member through the slotted end thereof providing an axis of rotation for the locking element, said locking element being formed with substantially cylindrical projections the longitudinal axes of which extended at right angles to and in non-intersecting relation with respect to the rotational axis of said locking element, and a set screw threadedly associated with the shank member coaxially of its longitudinal axis at its end opposite its slotted end for engaging the locking element to retain it in a fixed position.

MATHEW J. MARTY, Sr.
MATHEW J. MARTY, Jr.

REFERENCES CITED

The following references are of record in the file of this patent:

UNITED STATES PATENTS

| Number | Name | Date |
|---|---|---|
| 499,444 | Schumann | June 13, 1893 |
| 2,329,909 | Johnson | Sept. 21, 1943 |
| 2,337,483 | Marty | Dec. 21, 1943 |

FOREIGN PATENTS

| Number | Country | Date |
|---|---|---|
| 553,142 | Great Britain | May 10, 1943 |